United States Patent [19]

Laurent

[11] 4,074,224

[45] Feb. 14, 1978

[54] ACOUSTIC WAVE TRANSDUCER WITH AUTOMATIC COMPENSATION OF THE STATIC PRESSURE VARIATIONS

[75] Inventor: Jean Laurent, Morainvilliers, France

[73] Assignee: Institut Francais du Petrole, France

[21] Appl. No.: 733,052

[22] Filed: Oct. 18, 1976

[30] Foreign Application Priority Data

Oct. 27, 1975 France ............................... 75 32993

[51] Int. Cl.$^2$ ............................................ H04B 13/00

[52] U.S. Cl. .............................. 340/8 PC; 340/7 PC; 340/10; 340/12 R

[58] Field of Search .................. 340/8 PC, 7 PC, 8 R, 340/10 R, 12, 13, 14; 137/625.66, 625.69, 625.48

[56] References Cited

U.S. PATENT DOCUMENTS

| | | | |
|---|---|---|---|
| 2,404,785 | 7/1946 | Bostwick et al. | 340/8 PC |
| 2,444,049 | 6/1948 | King | 340/8 PC |
| 2,451,968 | 10/1948 | Murdock, Jr. | 340/8 PC |
| 3,235,835 | 2/1966 | Del Guidice et al. | 340/8 PC X |
| 3,489,995 | 1/1970 | Laurent | 340/14 |
| 3,623,507 | 11/1971 | Vogg et al. | 137/625.66 |

*Primary Examiner*—Harold Tudor
*Attorney, Agent, or Firm*—Craig & Antonelli

[57] ABSTRACT

Acoustic wave transducer comprising a sensitive element subjected on one face to the pressure variations of an external medium and on the other face to the pressure prevailing in an inner cavity of the body of the transducer, associated with automatic regulation means whereby said cavity communicates either with the external medium or with a source of fluid at a pressure exceeding that of the external medium, depending on the pressure level in said cavity as compared to that of the external medium.

14 Claims, 5 Drawing Figures

ACOUSTIC WAVE TRANSDUCER WITH AUTOMATIC COMPENSATION OF THE STATIC PRESSURE VARIATIONS

This invention relates to an acoustic wave transducer provided with an automatic system for compensating the pressure variations in the medium where it is operated.

This transducer may consist of a hydrophone adapted for operation within a wide range of depths.

A known process for compensating, within a certain range of depths, the variations of the hydrostatic pressure applied onto the front face of a sensitive element, consists of subjecting also the rear face thereof to said variations, through the use of an elastic membrane and of a mechanical acoustic filter leaving passage only to very low frequencies outside the range of the frequencies to be sensed. Such a filter consists for example of a thin pipe.

The devices making use of the process provide for a good compensation of the hydrostatic pressure variations but only for a water layer of relatively small thickness due to the limitations in the capacity of the membrane to be deformed.

The device of the invention offers the advantage, as compared the prior devices, of being operated satisfactorily within far wider ranges.

It comprises a sensitive element placed in a rigid body provided with at least one wall transparent to acoustic waves.

The sensitive element has a first face subjected through the transparent wall to the pressure prevailing in the external medium and a second face communicating with an inner cavity of said body.

This device is remarkable in that it comprises automatic regulation means for establishing communication between the inner cavity and the external medium, or a fluid source at a pressure permanently higher than that of the external medium, depending on the fact that the inner pressure of the cavity is either higher or lower than the pressure prevailing in the external medium.

The automatic regulation means may consist of a movable member housed in the inner cavity which is displaceable under the effect of the pressure difference between the pressure prevailing in the inner cavity on the side of the second face of the sensitive element and the pressure permanently applied by the external medium.

Other characteristics and advantages of the invention will be made apparent from the following description of non-limitative embodiments of the invention, given with reference to the accompanying drawings in which:

FIG. 1 diagrammatically shows a cross-sectional general view of the transducer;

Figure 5:
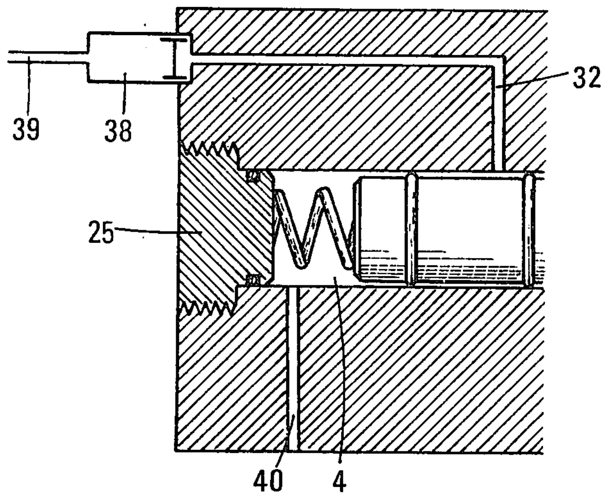
Figure 4:
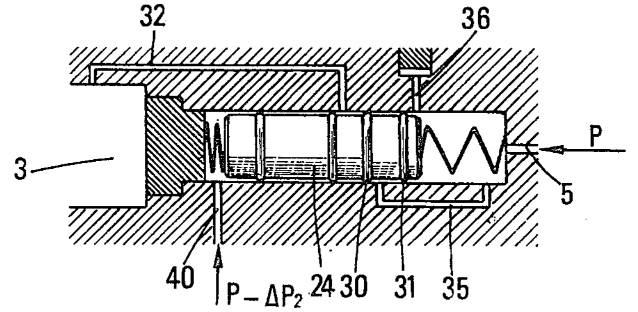

FIG. 4 is a cross-sectional diagrammatic view of the regulation means when the pressure applied onto the movable member by the external medium is lower than the pressure prevailing in the part of the cavity communicating with the second face of the sensitive member, and FIG. 5 diagrammatically shows a partial view of the regulation means in the case where the source of pressurized fluid is external to the transducer body.

Figure 1:
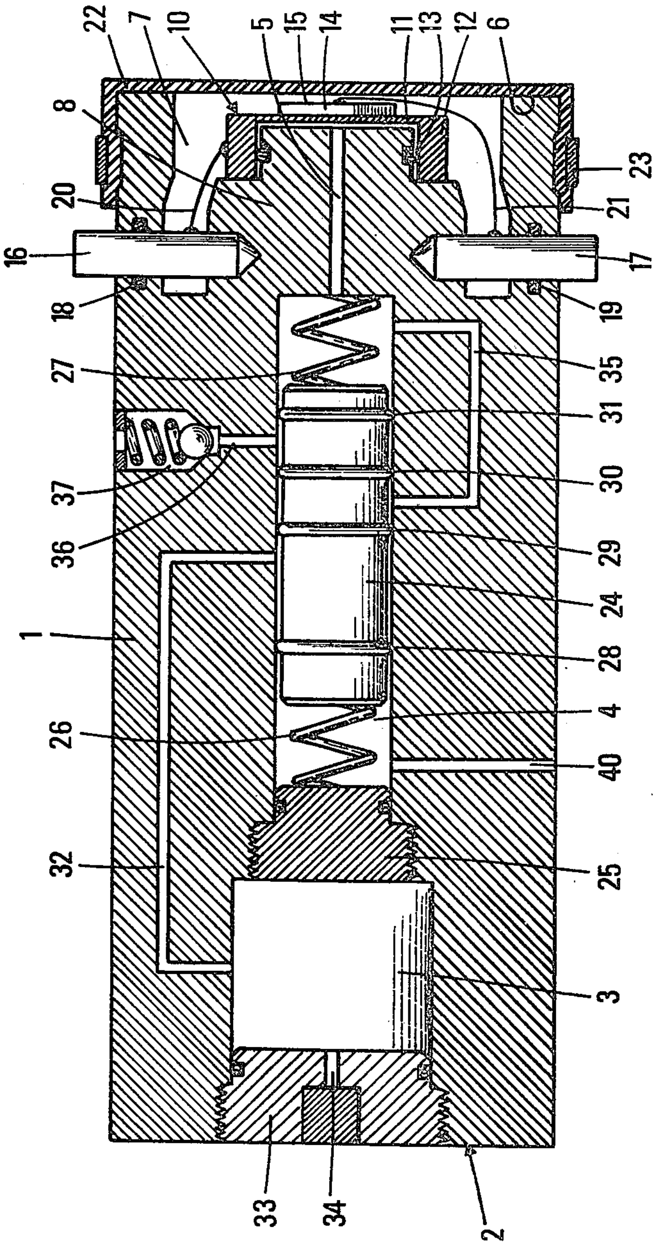

The transducer comprises (FIG. 1) an elongate rigid body 1 provided with a central substantially cylindrical cavity. This cavity comprises a first chamber 3 opening on one of the terminal walls 2 of the body and extending innerly through a second chamber 4 of a greater diameter than that of the first one. The second chamber communicates with a thin channel 5 opening on the other terminal wall 6 of body 1.

An annular cavity 7 is arranged in the terminal wall 6 and delimits a cylindrical protrusion 8 whose end portion comprises a shoulder supporting a sensitive assembly. The latter comprises a first electrode 10 consisting for example of a thin and flexible circular plate 11, provided with an annular raised edge 12 whose inner diameter is close to that of the shoulder of protrusion 8. A joint 13 ensures the tightening when the first electrode is driven onto the shoulder of protrusion 8. The spacing between the plate 11 and the protrusion 8 communicates with channel 5. A sensitive member 14, consisting for example of a disc made of piezoelectric material, is secured onto plate 11 for example by sticking. The opposite face of the sensitive element is solid with a second electrode 15, consisting, for example, of a metal deposit. Two conducting terminals 16 and 17 are engaged in radial housings provided in body 1 in the vicinity of the end wall 6, and pass throughout the annular cavity 7. Joints 18, 19, arranged in the housing about terminals 16 and 17, provide for the tightening between the annular cavity 7 and the outside of body 1.

The two electrodes 10, 15 of the sensitive element are connected through electric conductors 20 and 21 respectively to terminals 16 and 17 inside the annular cavity. Tight connectors and cables not shown provide for the electric connection between terminals 16, 17 and a using apparatus. The height of the lateral wall of the annular cavity 7 is higher than that of the cylindrical protrusion 8. A flexible membrane 22, made for example of rubber, closes the annular cavity 7. It is tightly held in place by means of a fastening annular ring 23 placed on the external wall of body 1. The chamber formed by the annular cavity, closed by the first electrode 10 and the membrane 22, is filled up with incompressible oil so as to transmit to the sensitive element the pressure variations from the external medium. Inside the second chamber 4 is provided a cylindrical member or piston valve 24 of a diameter slightly smaller than that of the chamber.

A threaded plug 25 tightly separates the first chamber 3 from the second one. Two antagonistic springs 26, 27 bearing respectively, on the one hand, on the threaded plug 25 and on the wall of the cavity traversed by channel 5 and, on the other hand, on the ends of the piston valve 24, hold the latter in a certain equilibrium state. Four tightening joints 28, 29, 30 and 31, solid with the piston valve 24 and arranged between the latter and the inner wall of the second chamber, separates the latter into five compartments. One of these compartments, delimited by joint 28 and containing spring 26, is permanently open, through channel 40, to the external medium. At the other end of the cavity, joint 31 delimits a second compartment containing spring 27 and in which opens channel 5. When the pressure difference Δp between the pressure applied by the external medium and that prevailing in the second compartment is substantially nil or does not exceed a predetermined value, a third compartment, delimited by joints 28 and 29, communicates through a channel 32 with the first chamber 3, separated from the external medium by means of a threaded plug 33. The latter is traversed by an injection pipe 34 whereby a fluid under a pressure higher than the maximum pressure prevailing in the external medium within the specified depth limits may be introduced in the first chamber.

Similarly, a fourth compartment, delimited by joints 29 and 30, communicates through a channel 35 with the second compartment and the two joints 30 and 31 delimit a fifth compartment which may communicate with the external medium through channel 36.

A non-return valve 37 is placed in channel 36. It can only open when the difference between the internal and external pressures is positive.

It has been observed by experiment that the sensitivity of the sensitive element used in the device of the invention was very good when the difference between the pressures prevailing respectively on both sides of the carrying electrode 10 was within a range of 10 bars about the equilibrium pressure.

The wide range of pressure difference tolerated by the sensitive element makes it possible to adjust the device so that only the pressure variations exceeding a certain threshold value will result in pressure adjustments.

By this way, it is possible to avoid too frequent adjustments and the resulting beatings when the pressure of the external medium is subjected to variations or fluctuations.

The threshold value of the pressure variations is determined by experiment by varying the friction of the joints solid with the piston valve 24 against the inner wall of the first chamber. The piston valve can be displaced only when the force corresponding to the pressure difference $\Delta p$ is greater than the friction forces. The adjustment is performed so that only a difference $\Delta p$ of several bars will result in a displacement of the piston valve.

Figure 2:
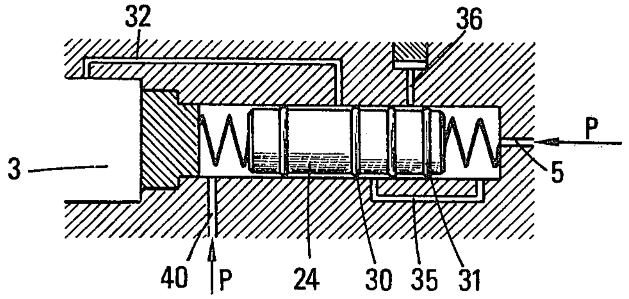
FIG. 2 is a cross-sectional diagrammatic view of the regulation means in a state of equilibrium, when the pressure difference applied onto the movable member is substantially nil.
Figure 3:
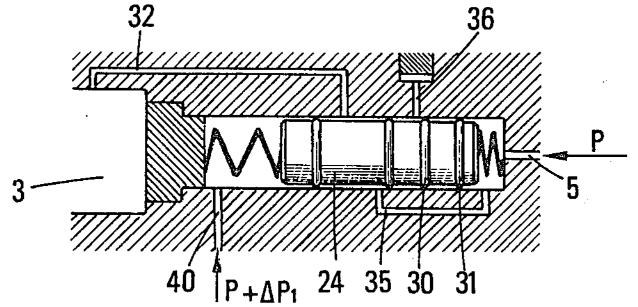
FIG. 3 is a cross-sectional diagrammatic view of the regulation means when the pressure applied onto the movable member by the external medium is greater than the pressure prevailing in the part of the cavity communicating with the second face of the sensitive member.

When the pressure difference $\Delta p$ is smaller than the threshold value, the piston valve will be in equilibrium position illustrated in FIG. 2. When the pressure prevailing in the external medium increases and the pressure difference $\Delta p_1$ becomes higher than the threshold value (FIG. 3) the piston valve is displaced in the direction of the end wall of the cavity in communication with channel 5, and compresses spring 27.

The position of the tightening joint 29 and the length of channel 35 are so selected that the second and third compartments are then in communication. The rear face of the electrode carrying the sensitive element is in communication with the first chamber containing the pressurized fluid. The pressure is applied onto the rear face and pushes the piston valve up to an equilibrium position corresponding to a $\Delta p$ value smaller than the threshold value.

When, on the contrary, the pressure prevailing in the external medium decreases until the pressure difference $\Delta p_2$ exceeds the threshold value but in opposite direction, the piston valve moves towards the threaded plug 25 and compresses spring 26.

The discharge channel 36 is so arranged as to be then in communication with the second compartment into which opens channel 5. The pressure in said second compartment being higher than that of the external medium, the non-return valve 36 opens and some fluid escapes to the outside until the motion of the piston valve drives back the fourth compartment delimited by joints 29 and 30 in front of channel 36.

When the device progressively sinks in water, it reaches successively several compression levels at which the pressure difference is greater than the threshold value and is quickly reduced to a value compatible with a good operation of the sensitive element. A similar procedure is used when the device is progressively raised up to the surface.

In the described embodiment, channel 32 communicates with the first chamber 3 of the cavity filled up with a pressurized fluid. It would not be outside the scope of the invention to change the device as shown by FIG. 5.

In this new embodiment, the internal cavity no longer communicates with a single chamber 4 closed with a threaded plug 25 provided with tightening means.

Channel 32 is connected, through a tight connector 38, diagrammatically shown, to a pipe 39 communicating with a pressurized fluid reservoir, not shown. This reservoir is placed on the surface installation when the device is used as hydrophone.

What I claim is:

1. An acoustic wave transducer drive comprising a sensitive element disposed in a rigid body provided with at least one wall transparent to acoustic waves, the sensitive element having a first face subjected through said transparent wall to the pressure prevailing in an external medium and a second face in front of an inner cavity of said body, automatic regulation means for establishing communication between the inner cavity and the external medium or a source of fluid at a pressure permanently higher than that of the external medium, depending on whether the internal pressure in said cavity is either greater or smaller than the pressure prevailing in the external medium, said regulating means comprising a member movable in said inner cavity and delimiting with the inner surface thereof several compartments respectively communicating, when the pressure difference is lower than a certain threshold value, directly with the external medium, directly with the source of pressurized fluid, with the portion of the cavity in front of the second face of the sensitive element and with the external medium through a valve which may open toward the outside of the rigid body, said compartments being separated from one another.

2. A device according to claim 1, wherein the internal cavity comprises a first chamber containing the automatic regulation means and a second chamber filled up with a fluid under a pressure permanently higher than that of the external medium forming said fluid source.

3. A device according to claim 1, wherein the sensitive element comprises a disc made of a piezoelectric material and associated with two electrodes, one of which comprises a flexible plate provided with a rigid raised edge taking its bearing on a wall of the rigid body.

4. A device according to claim 3, wherein said wall on which the raised edge of the plate takes its bearing is a wall of a second cavity arranged in the end portion of said body and closed by said wall transparent to acoustic waves, said cavity being filled up with an incompressible liquid, and the second face of the sensitive element being subjected to the pressure prevailing in the inner cavity of the body, through a thin channel.

5. A device according to claim 4, wherein the electrodes of the sensitive element are connected, inside the second cavity, to electric terminals passing through the lateral wall of said second cavity.

6. A device according to claim 1, wherein the source of fluid at a pressure higher than that of the external medium is housed inside the rigid body.

7. A device according to claim 1, wherein the movable member comprises a stem of constant section smaller than that of the cavity and sealing joints secured to the stem, the space between the inner wall of the cavity and the stem being subdivided by the sealing joints substantially tightly and delimiting said compartments.

8. An acoustic wave transducer device comprising a sensitive element disposed in a rigid body provided with at least one wall transparent to acoustic waves, the sensitive element having a first face subjected through said transparent wall to the pressure prevailing in the external medium and a second face in front of an inner cavity of constant section within the body, a movable member of constant section smaller than that of the cavity, sealing joints secured to the movable member and in contact with the inner wall of the cavity, the friction coefficient of the sealing joints being so selected that the medium pressure difference producing a displacement of the movable member is equal to a determined threshold value, the annular space between the movable member and the inner wall of the cavity being subdivided in several compartments tightly separated from one another by the sealing joints and respectively communicating, when the pressure difference is lower than the threshold value, directly with the external medium, directly with a source of pressurized fluid, with a portion of the cavity in front of the second face of the sensitive element and with the external medium through a valve which may open toward the outside of the rigid body.

9. A device according to claim 8, wherein the internal cavity comprises a first chamber containing the movable member and a second chamber filled up with a fluid under a pressure permanently higher than that of the external medium forming said fluid source.

10. A device according to claim 8, wherein the sensitive element comprises a disc made of piezoelectric material and associated with two electrodes, one of which comprises a flexible plate provided with a rigid raised edge taking its bearing on a wall of the rigid body.

11. An acoustic wave transducer, said transducer comprising:

a rigid body member having at least one wall which is transparent to acoustic waves and an inner cavity;

a pressure sensitive element mounted within said body between said wall and said cavity with a first face oriented so as to be subjected to the pressure of an external medium through said transparent wall, and with a second face in front of said inner cavity; and automatic regulation means associated with said inner cavity for communicating a portion of said inner cavity which is in communication with either an external medium or a source of fluid at a pressure higher than the pressure of said medium depending on whether the pressure in said portion is greater than or smaller than the pressure of said external medium, and in a first position, said regulating means separately communicating with the external medium, the source of fluid, the portion of said inner cavity, and an outwardly opening checkvalve when the difference between the pressure of said external medium and the pressure within said portion is lower than a predetermined threshold value.

12. The acoustic wave transducer according to claim 11, wherein said regulating means includes a movable member mounted within said inner cavity.

13. The acoustic wave transducer according to claim 12, wherein a plurality of sealing elements act in conjunction with said movable member and the walls of said inner cavity to define a plurality of separate compartments through which said member communicates with the external medium, fluid source, cavity portion, and checkvalve in said first position, and wherein the coefficient of friction of said sealing elements is such that the minimum pressure difference required to displace said movable member corresponds to said threshold value.

14. The acoustic wave transducer according to claim 13, wherein in a second position, said regulating means communicates said inner cavity portion with said fluid source when the pressure in said cavity portion is less than said external pressure by an amount excess of said threshold value, and in a third position said regulating means communicates said inner cavity portion with said external medium via said checkvalve when the pressure in said cavity portion exceeds said external pressure by an amount in excess of said threshold valve.

* * * * *